March 17, 1936.  M. L. ORD  2,034,245
PHONOGRAPH
Filed Jan. 21, 1929  12 Sheets-Sheet 2

Inventor:
MALCOLM L. ORD,
By John M. ......
His Attorney.

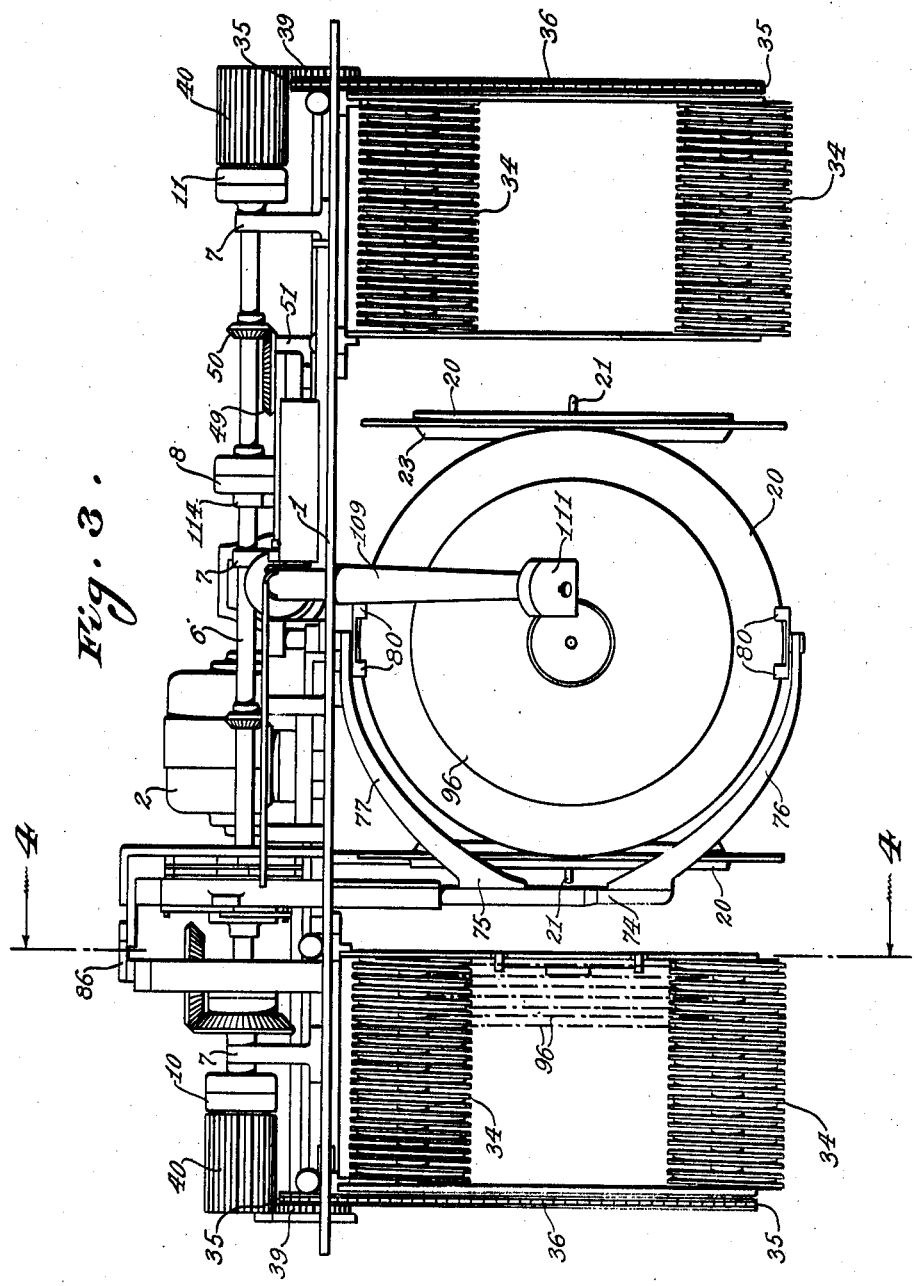

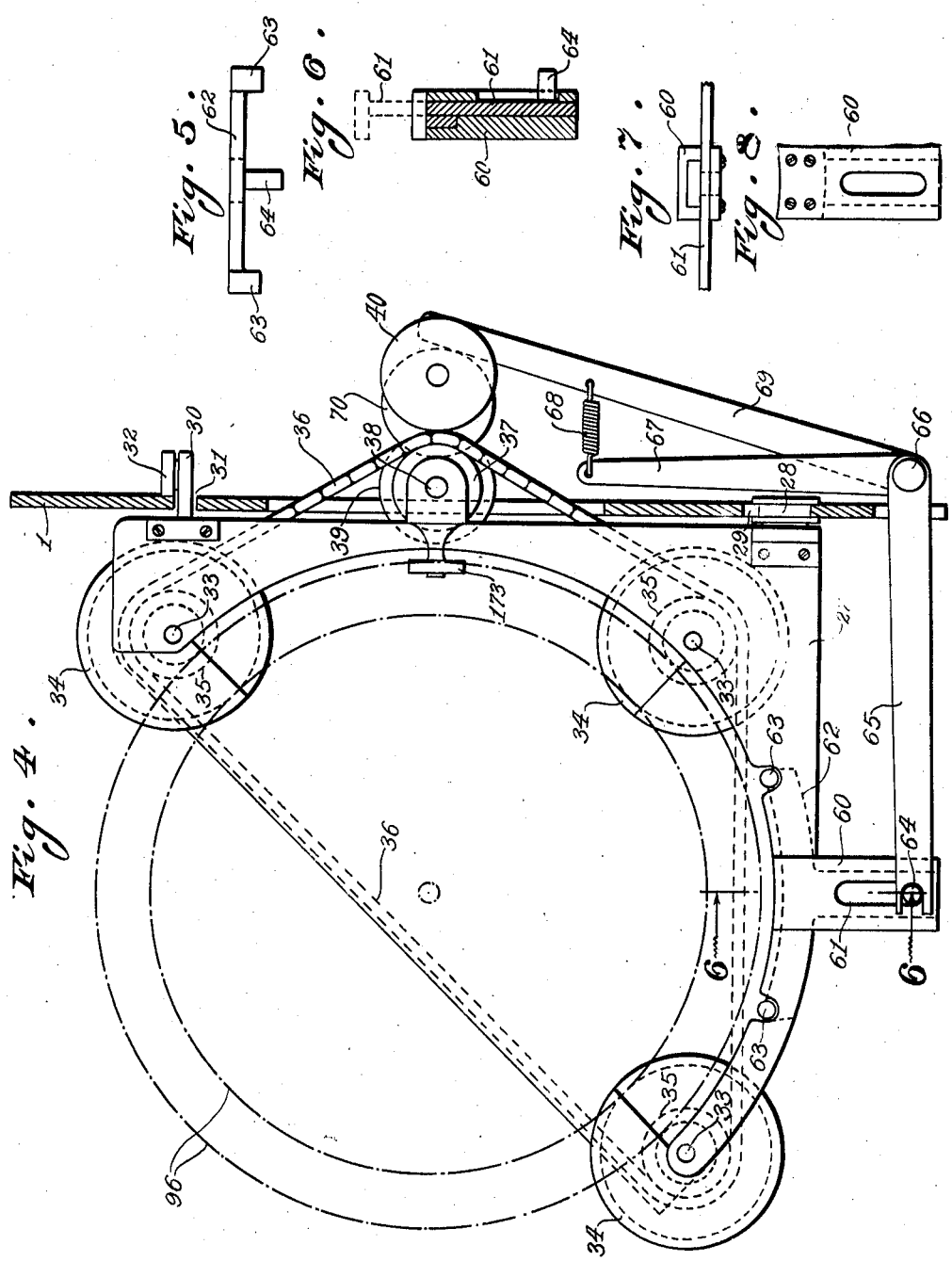

March 17, 1936. M. L. ORD 2,034,245
PHONOGRAPH
Filed Jan. 21, 1929 12 Sheets-Sheet 5

March 17, 1936.　　　M. L. ORD　　　2,034,245
PHONOGRAPH
Filed Jan. 21, 1929　　12 Sheets-Sheet 6
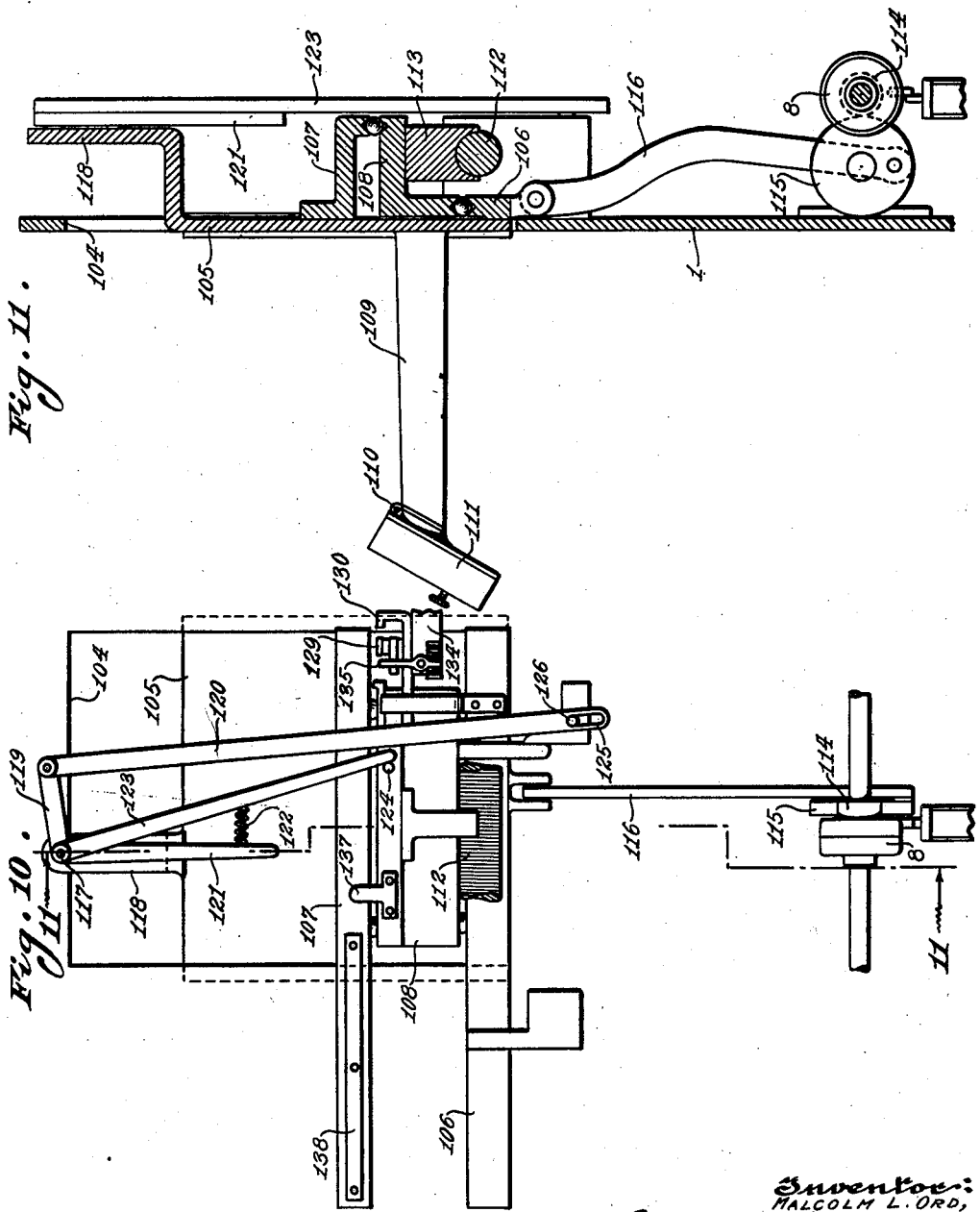

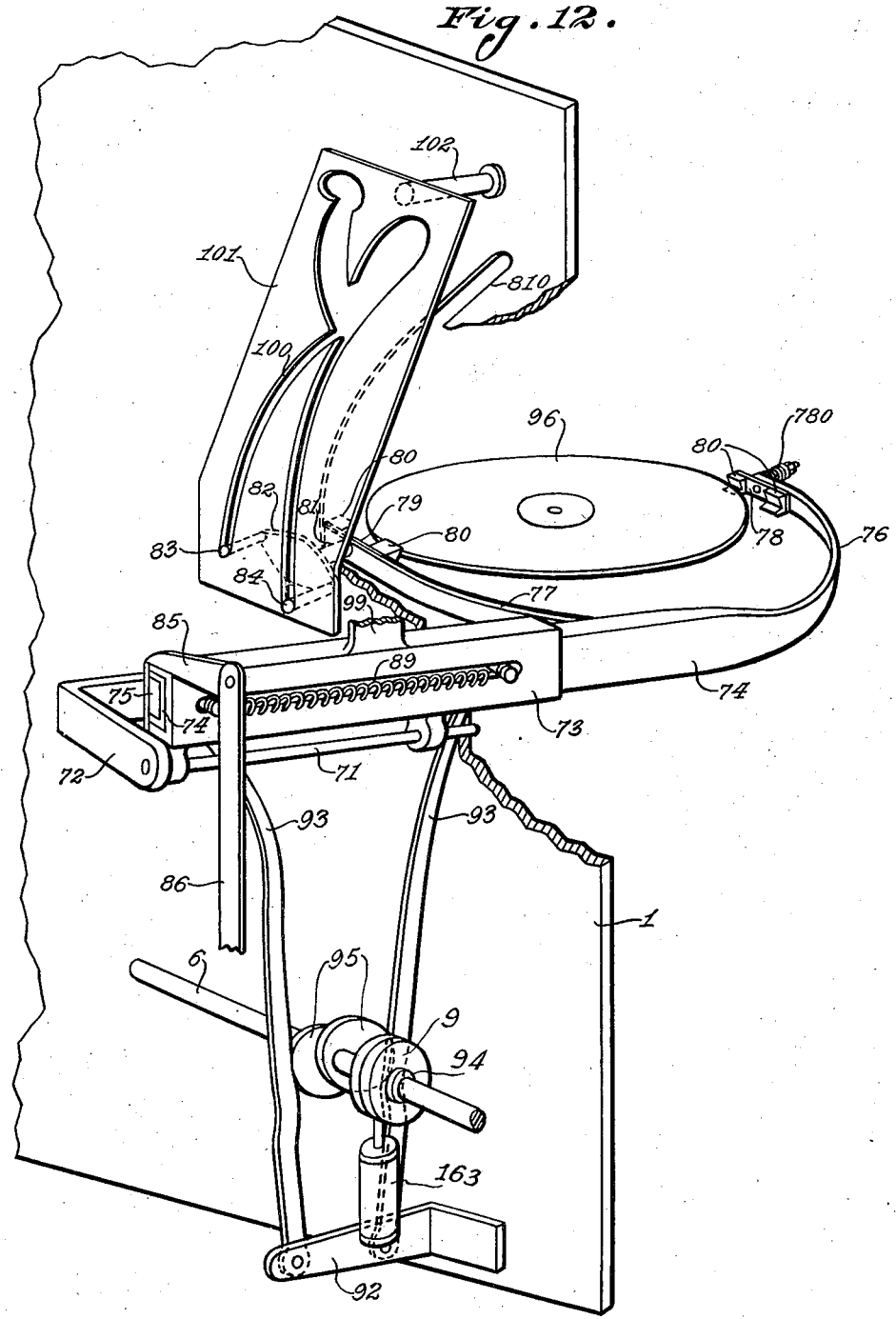

March 17, 1936.   M. L. ORD   2,034,245
PHONOGRAPH
Filed Jan. 21, 1929   12 Sheets-Sheet 8

Inventor:
MALCOLM L. ORD,
By John W. Bruning
His Attorney.

March 17, 1936.    M. L. ORD    2,034,245
PHONOGRAPH
Filed Jan. 21, 1929    12 Sheets-Sheet 9

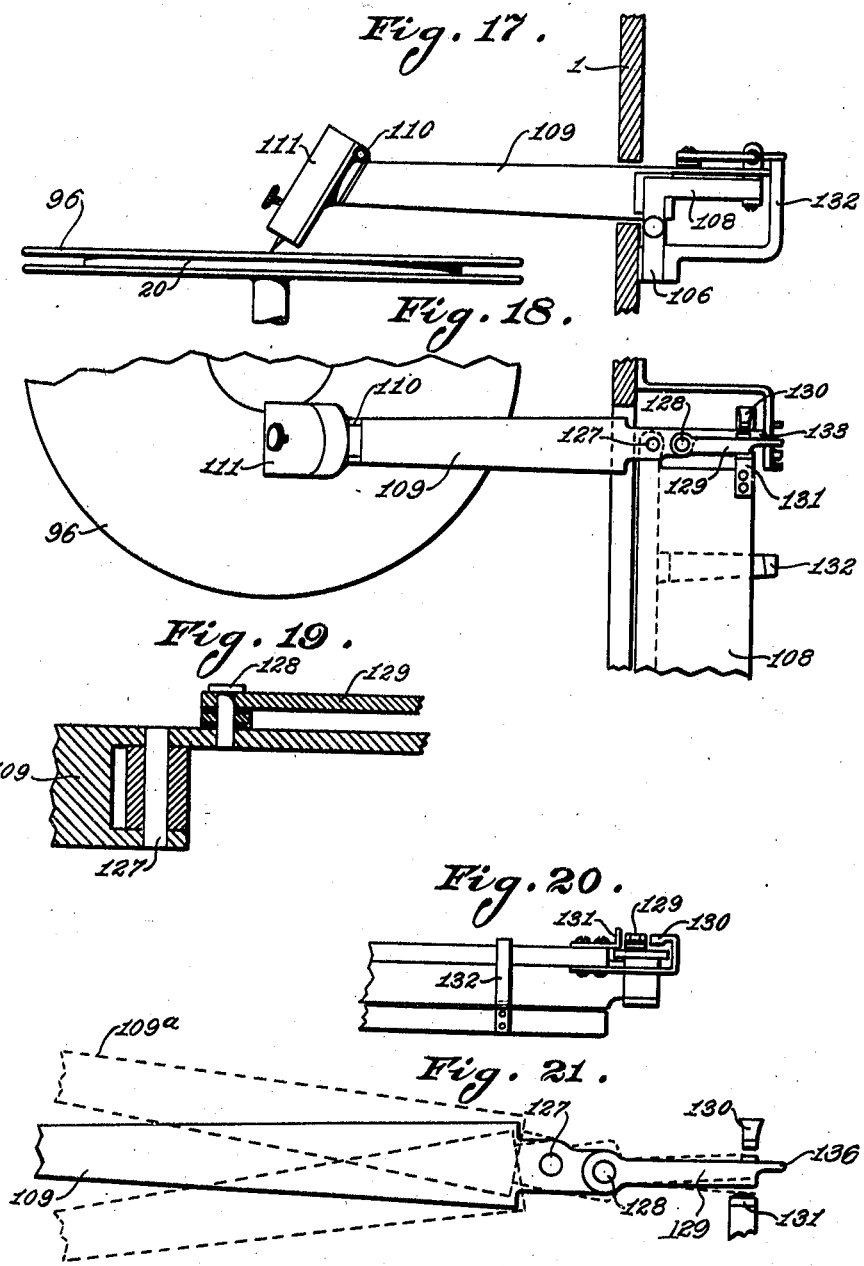

March 17, 1936.  M. L. ORD  2,034,245
PHONOGRAPH
Filed Jan. 21, 1929  12 Sheets-Sheet 11
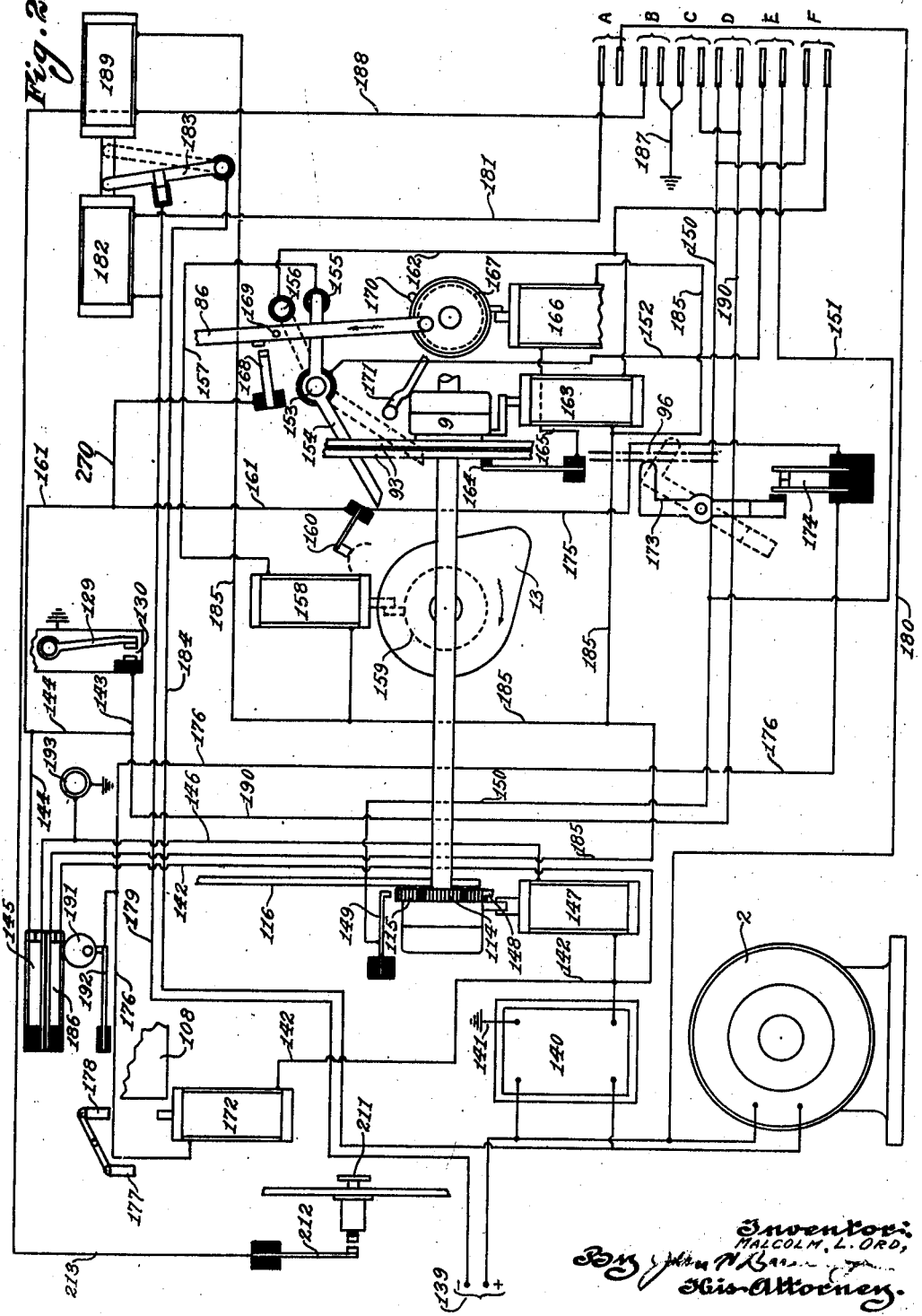

March 17, 1936.　　　　M. L. ORD　　　　2,034,245
PHONOGRAPH
Filed Jan. 21, 1929　　　12 Sheets-Sheet 12
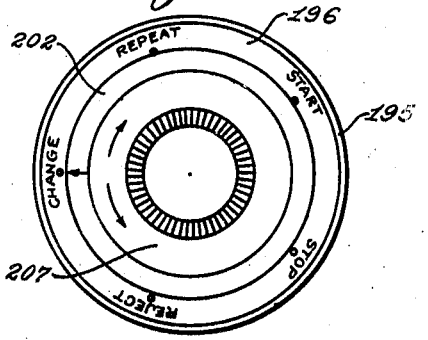
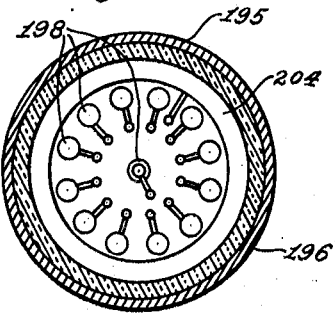
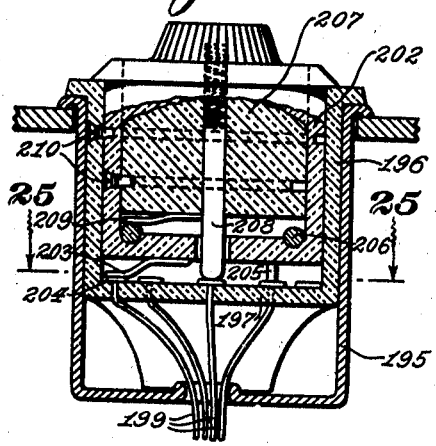
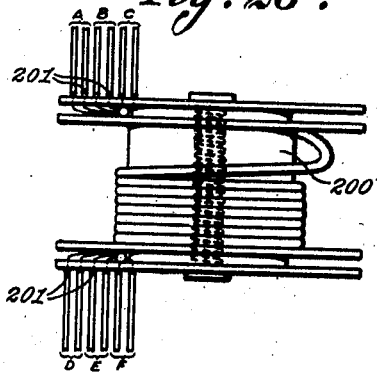
Inventor:
MALCOLM L. ORD,
By John N. Brunner
His Attorney.

Patented Mar. 17, 1936

2,034,245

UNITED STATES PATENT OFFICE 2,034,245

PHONOGRAPH

Malcolm L. Ord, New York, N. Y.

Application January 21, 1929, Serial No. 334,036

26 Claims. (Cl. 274—10)

This invention pertains to phonographs and more particularly to that type of phonograph which is arranged to play a series of records in succession and to change the records automatically.

One of the objects of this invention is to provide an automatic phonograph which will play in succession a series of records placed in the magazine thereof, and which will, if desired, play both sides of each record either in order or otherwise.

Another object is to provide such a phonograph which will play a succession of records at brief intervals so that a long pause between records is eliminated.

Another object is to provide such a phonograph with novel means for inverting a record so as to play both sides thereof in succession.

Another object is to provide such a phonograph which will handle records of any size and in whatever order they may be placed in the machine.

Another object is to provide such a phonograph in which the action of the mechanism for changing or inverting records is started at a predetermined interval after or before finishing the playing of any record irrespective of the size or make of the record.

Another object is to provide such a phonograph with novel mechanism whereby the tone arm is lifted from the record at the completion of the playing thereof, and returned to the starting point of the new record and which is automatically adjusted to the size of the record so that the proper starting point will be set irrespective of the size of the record.

Another object is to provide novel mechanism for feeding the tone arm across the record which will function properly irrespective of the pitch of the record groove.

Another object is to provide mechanism whereby the needle is moved radially across the record and so that the axis of the tone arm remains tangent to the record grooves.

Another object is to provide such a phonograph with means for controlling the operation of the various portions of the mechanism so that a record may be changed or inverted at any time during the playing thereof.

Another object is to provide such a phonograph so arranged that a part of the automatic features may be rendered inoperative and the machine used as a single record phonograph manually controlled, as to some of its operation.

Another object is to provide such a phonograph with means adapted to compensate for variations in the dimensions of the records so that each record is properly centered when placed upon the playing table irrespective of the size of the record or inaccuracies in its dimensions.

Another object is to provide for a combination local and distance control for placing in operation, the various movements of the instrument in order to effect a change, repeat or inversion of the records and to start, stop and control the volume of the amplifier.

Other objects will appear from the following description taken in connection with the accompanying drawings, in which:

Fig. 3 is a plan view of Fig. 1;

Fig. 4 is a partial sectional view taken about on line 4—4, Fig. 3;

Fig. 5 is a detail of Fig. 4;

Fig. 6 is a detail section taken on line 6—6, Fig. 4;

Figs. 7 and 8 are details of Fig. 4;

Fig. 10 is a detail view somewhat enlarged of the tone arm returning mechanism;

Fig. 11 is a section on line 11—11, Fig. 10;

Fig. 12 is a perspective detail of the record inverting mechanism;

Fig. 17 is a further detail of the tone arm mechanism illustrating the means for timing the beginning of the operation for changing the records;

Fig. 18 is a plan view of Fig. 17;

Figs. 19, 20 and 21 are details of Figs. 17 and 18; and

Fig. 22 is an electric circuit diagram showing the electrical connections of the various relays which control the operation of the machine;

Fig. 23 is a sectional view of the remote control device;

Fig. 24 is an end view of the same;

Fig. 25 is a section on line 25—25, Fig. 23; and

Fig. 26 is a sectional view of the cable reel.

Figure 1:
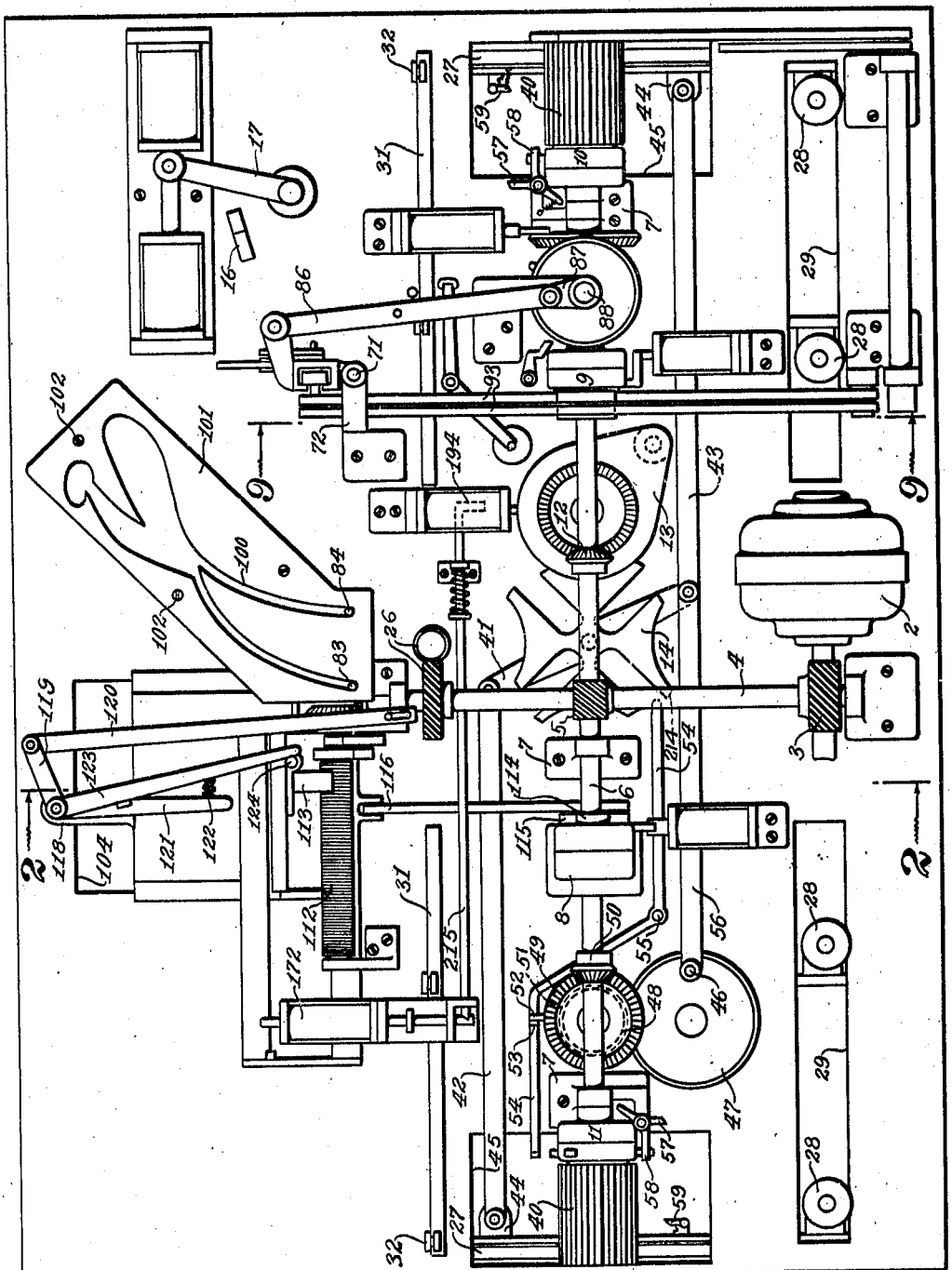
Fig. 1 is a rear view of a machine embodying this invention with the casing removed.

Referring to the drawings, 1 designates a supporting plate upon which the greater part of the mechanism is mounted. This plate may be suitably supported on a base and enclosed in a suitable cabinet or the like, in accordance with the usual practice. The base, cabinet, and other non-essential features have been omitted from the drawings so as to save space and avoid unnecessary complications.

Driving mechanism

Mounted on the plate but near the bottom thereof is an electric motor 2 which is connected through suitable gearing 3 to drive the vertical shaft 4. The shaft 4 is connected by a worm or bevel gear 5 with a horizontal shaft 6 mounted on suitable bearings 7 on the plate 1. Mounted on the shaft 6 to be driven thereby is a series of automatic clutches 8, 9, 10 and 11. These clutches are arranged to drive different sub-sections of the mechanism as will be more fully described hereinafter. These clutches are so arranged that they are held idle or disconnected from the shaft 6 by the engagement of a dog on the clutch with a suitable stop interposed in its path. This is arranged in such a way that by removing the stop so as to release the dog the clutch is automatically connected to be driven by the shaft. This connection is maintained until the stop is again interposed in the path of the dog, usually after one revolution when its movement is again arrested. For a detail description of these clutches reference may be had to United States Letters Patent No. 1,508,986, issued to Malcolm L. Ord, September 16, 1924. The shaft 6 is further connected by a bevelled gear 12 to operate the driving member 13 of a Geneva gear 13—14, which operates to turn the turret carrying the playing tables, as will be described hereinafter.

Playing mechanism

Figure 2:
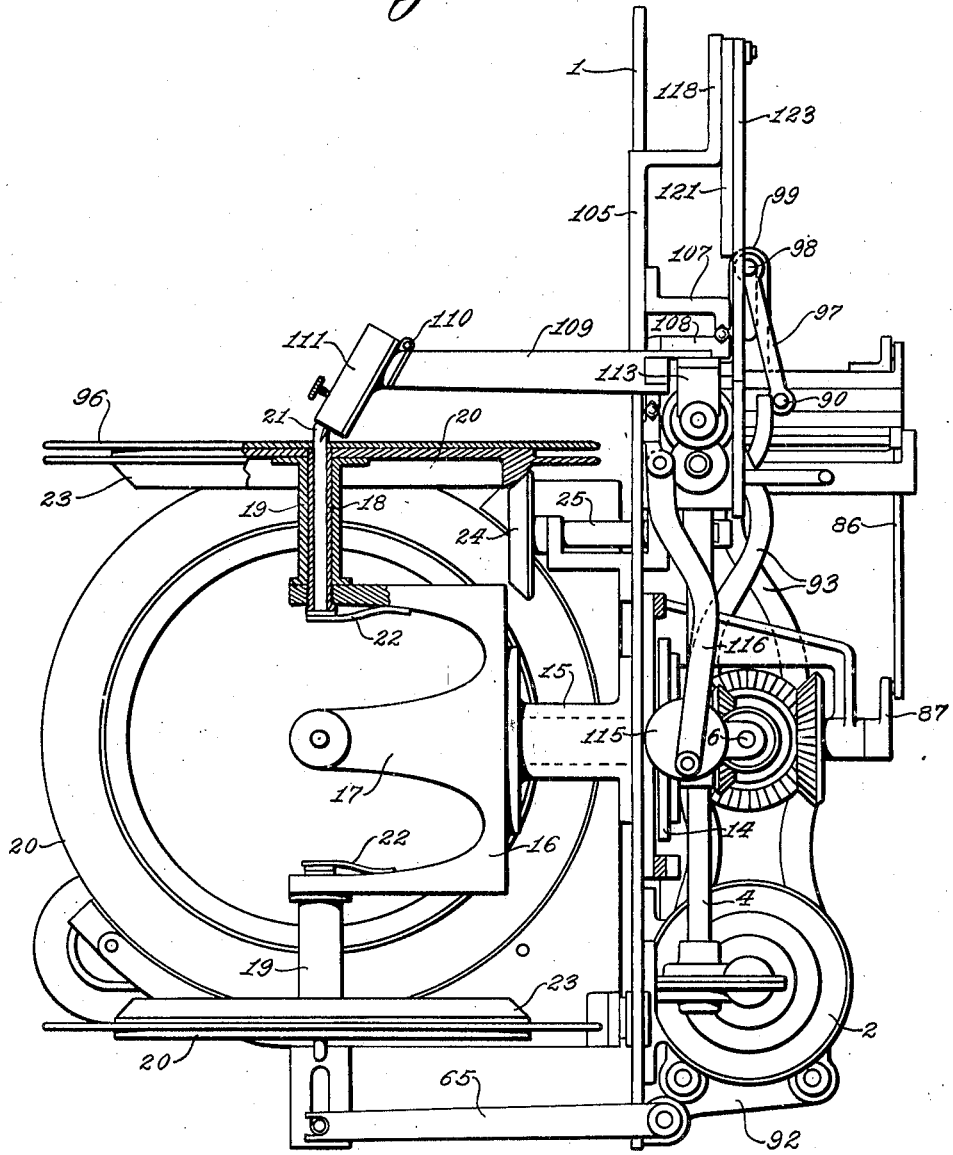
Fig. 2 is a sectional view taken on line 2—2 Fig. 1.

Referring more particularly to Figs. 1 and 2, mounted on a shaft suitably journalled in a bearing 15 mounted on the plate 1 is a rotatable turret 16 having a plurality of forwardly extending arms 17. In the case illustrated, 4 arms are provided, each of which has fixed therein a hollow bearing 18 having rotatable thereon a hollow hub 19 of and carrying a rotatable table 20 upon which the record may be placed for playing. Within the hollow bearing 19 is mounted a pin 21 yieldingly held by a spring 22 so that its outer end projects beyond the face of the table 20 in a position to receive a record. The spring 22 renders the pin 21 yieldable to pressure against the end thereof for a purpose which will later be described.

Each table 20 is provided on its under side with a bevelled friction driving face 23 adapted to engage a correspondingly bevelled frictional driving cone 24 when the table 20 is in its uppermost position as shown in Fig. 2. The cone 24 is carried by a shaft 25 mounted in a bearing at right angles to the plate 1 and passing through a perforation therein to the rear thereof where it is connected by worm gearing 26 to be driven by the shaft 4.

The shaft which carries the turret 16 passes through a perforation in the plate 1 to the rear thereof and mounted on said shaft in rear of the plate 1 is the driven member 14 of the Geneva gear. It will be seen that the operation of the Geneva gear rotates the turret 16 through one-fourth of a revolution at a time so as to bring the different playing tables 20 successively into the uppermost or playing position. In this position the table comes into frictional engagement with the driving cone 24, which rotates continuously while the machine is in operation, to be driven thereby for the purpose of playing the record.

The record magazine

Referring more particularly to Figs. 3 to 8 inclusive, mounted to slide longitudinally of the machine are two magazines, one for holding the records before playing and to transfer the same to the playing tables and the other to receive the played records from the playing tables. Each magazine comprises a frame 27 provided at its lower portion with grooved rollers 28 operating in slots 29 in the plate 1. The upper part of the frame 27 is provided with brackets 30 extending through a slot 31 in the plate 1, and carrying rollers 32 bearing against the rear side of the plate so as to support the magazine in an overhanging position in front of the plate. Mounted on shafts 33 extending between the frames 27 on each end of the magazine are three record supports 34. Each of these supports is formed as shown in Patent No. 1,508,986 and is provided with two helical grooves having the same pitch but different depths. The depths of the two sets of grooves are adjusted so that 12 inch records may be supported in the deep grooves and 10 inch records in the shallow grooves. Each shaft 33 is provided at the outer end thereof with a sprocket 35, and a chain 36 passes over all three sprockets and a driving sprocket 37 mounted on a stub shaft 38 which carries at its end a spur gear 39. The spur gear 39 meshes with an elongated gear 40 connected to be driven by one or the other of the clutches 10 and 11. The gear ratios are such that upon operation of the clutches 10 and 11 through one revolution the helical supports 34 are each rotated through one revolution. During this movement a record set in any of the grooves will be advanced by the screw action of these holders a distance equal to the pitch of the helical groove.

One of these movable magazines is mounted on each side of the turret 16, as shown in Fig. 3. Mechanism is provided for moving these two magazines simultaneously toward the turret so as to transfer a record from one magazine to a playing table on the turret, and so as to take another record from the opposite playing table and deposit it in the other magazine. This mechanism comprises a lever 41 Fig. 1, pivoted concentrically with the turret 16 on the plate 1, and pivotally connected at its ends to longitudinally extending links 42 and 43; these links are pivoted at their ends to brackets 44 on the frames 27 of the magazines. In order to provide for these connections and to allow for the movement thereof openings 45 are cut in the plate 1. Pivoted to the end of the link 43 is a link 56 pivoted at 46 to a gear 47 meshing with a smaller gear 48 on a stub shaft which also carries a bevelled gear 49 driven by a pinion 50 on the shaft 6. The gear 49 bears a one to two ratio to the gear 47 and is connected to the stub shaft through a clutch 51 (see Fig. 3). The clutch 51 is similar in its construction and operation to the clutches 8 and 9, previously described, and has a dog 52 which stands before a shoulder 53 on a lever 54 pivoted at 55 on the plate 1, and having its other end positioned for engagement by the lugs 214 of the Geneva gear when the latter rotates.

Rotation of the member 14 in turning the turret brings lugs 214 successively into engagement with the end of the lever 54 so as to swing said lever on its pivot, thereby carrying the shoulder 53 out of engagement with the dog 52. This permits the clutch to connect the gear 48 so as to be driven through one revolution. This movement moves the gear 47 through one half revolution which acts through the links 56, 43 and 42 to draw the two magazines inwardly toward the turret. This movement carries the left hand magazine, Fig. 3, close enough to the playing table facing it on the turret so that a record mounted in the ends of the supports 34 will be brought against the yieldable pin 21 of that playing table. The magazine is so located that the pin 21 will engage the record slightly above the central hole thereof. The purpose of this will be explained presently. The right hand magazine, Fig. 3, is brought by the above described movement to such a position that the ends of the grooves in the supports 34 stand opposite a record which may be carried on the pin 21. Just before the magazines have reached these positions arms 57 (Fig. 1) of pivoted bell crank levers (whose other arms 58 are in the paths of the dogs of the clutches 10 and 11) are engaged by trips 59 mounted on the frames 27 of the magazine.

This engagement acts to swing the bell crank levers on their pivots so as to carry the arms 58 out of engagement with the dogs of the clutches 10 and 11. This permits the clutches to act so that the gears 40 are connected to be driven by the shaft 6. Movement of the gears 40 acts to drive the gears 39 which have during the inward movement of the magazines been sliding along the gears 40, so as to drive the supports 34 each through one revolution. The bell crank levers and the trips are held against stops by springs shown in Fig. 1; accordingly when the arms 57 engage the trips, these arms are moved by and beyond the trips so as to permit the bell crank lever springs to snap the levers back in order to place the arms 57 again in the paths of the clutch dogs to again disengage the clutches after one revolution. When the magazines again move inwardly the arms 57 can move freely under the trips.

As the supports 34 are turned through one revolution the helical groove on the left hand magazine, Fig. 3, acts to feed the records forward thereon so that the end record is fed further toward the playing table on that side of the turret. At the same time the corresponding movement on the right hand magazine, Fig. 3, causes the ends of the grooves in the supports 34 to engage the record supported on the pin 21 of the right hand playing table and by the screw action thereof to carry this record off of the pin and retain it in the magazine.

As previously stated, the magazine which feeds the records to the playing tables is positioned a little low so that the record will approach the pin 21 with its central hole slightly lower than said pin. The purpose of this construction is to provide for properly centering records of different diameters. This is necessary on account of the fact that records of the same nominal diameter are not uniform in their dimensions but vary to such an extent that a permanent alinement with the pins 21 is impractical. In order, therefore, to mount a record on the pin 21 the inner end of frame 27 of the left hand magazine, Fig. 3, is provided with a downwardly extending guide 60 adapted to receive the shank 61 of a bracket 62 having at its upper portion a pair of spaced pins 63 adapted to engage the lower edge of a record. The shank 61 carries a pin 64 engaging the slotted end of a bell crank lever arm 65 pivoted at 66 and whose other arm 67 is connected by a spring 68 to a lever 69, also pivoted at 66. The upper end of the lever 69 is positioned to engage an eccentric cam 70 mounted on the shaft which carries the elongated gear 40.

When the gear 40 is rotated in order to rotate the supports 34, the cam 70 swings the lever 69 outwardly. This lever acts through the spring 68 to yieldingly swing the bell crank lever on its pivot, thereby raising the bracket 62. This causes the pins 63 to engage the lower edge of the record which has been brought against the pin 21 of the left hand playing table, Fig. 3, which pin has been pressed inwardly against its spring. The movement of the bracket 62 is of sufficient extent to engage a record of any size and raise the same until its central hole comes opposite the pin 21, whereupon said pin snaps into the hole so as to support the record. The record has, previous to this, been fed off of the supports 34 and is now supported entirely by the pin 21. Upon reference to Fig. 4 it will be noted that the pins 63 support the record at a sufficiently spaced distance circumferentially of the record so that the central hole thereof will be always laterally aligned with the pin 21.

*Record inverting mechanism*

In accordance with this invention both sides of a record may be played in succession. In order to accomplish this, the record after playing one side is removed from the playing table, inverted, and replaced so that the reverse side may be played before changing records. The mechanism for accomplishing this movement is shown more particularly in Figs. 1, 9 and 12 to 15 inclusive. Pivoted on a bearing 71, Fig. 12, on a bracket 72 mounted on the plate 1 is a channel shaped guide 73. Mounted to slide in the guide 73 is a pair of telescoping members 74 and 75, equipped at their ends with curved arms 76 and 77. These arms are equipped at their ends with gripping elements 78 and 79, each comprising a short bar pivoted at its center on the arm and provided at its ends with notched fingers 80 of a suitable material such as rubber. The member 78 while pivoted on the arm 76 is held frictionally as by a spring 780 on its shank. In the case of the gripping member 79, its pivot 81 extends through an arcuate slot 810, in the plate 1, whose center is concentric with the pivot bearing 71, and is equipped at the rear of said plate with a cross arm 82 carrying at its ends spaced pins 83 and 84. The guide 73 has attached thereto a lever arm 85 which has pivoted to the end thereof a link 86 having its other end pivoted to a crank arm 87 on a stub shaft 88, Figs. 1–2. Mechanism is provided which will be more fully described hereinafter, for operating the crank 87 so as to draw the link 86 downwardly thereby swinging the guide 73 on its pivot 71 in order to swing the arms 76 and 77 upwardly.

Figure 9:
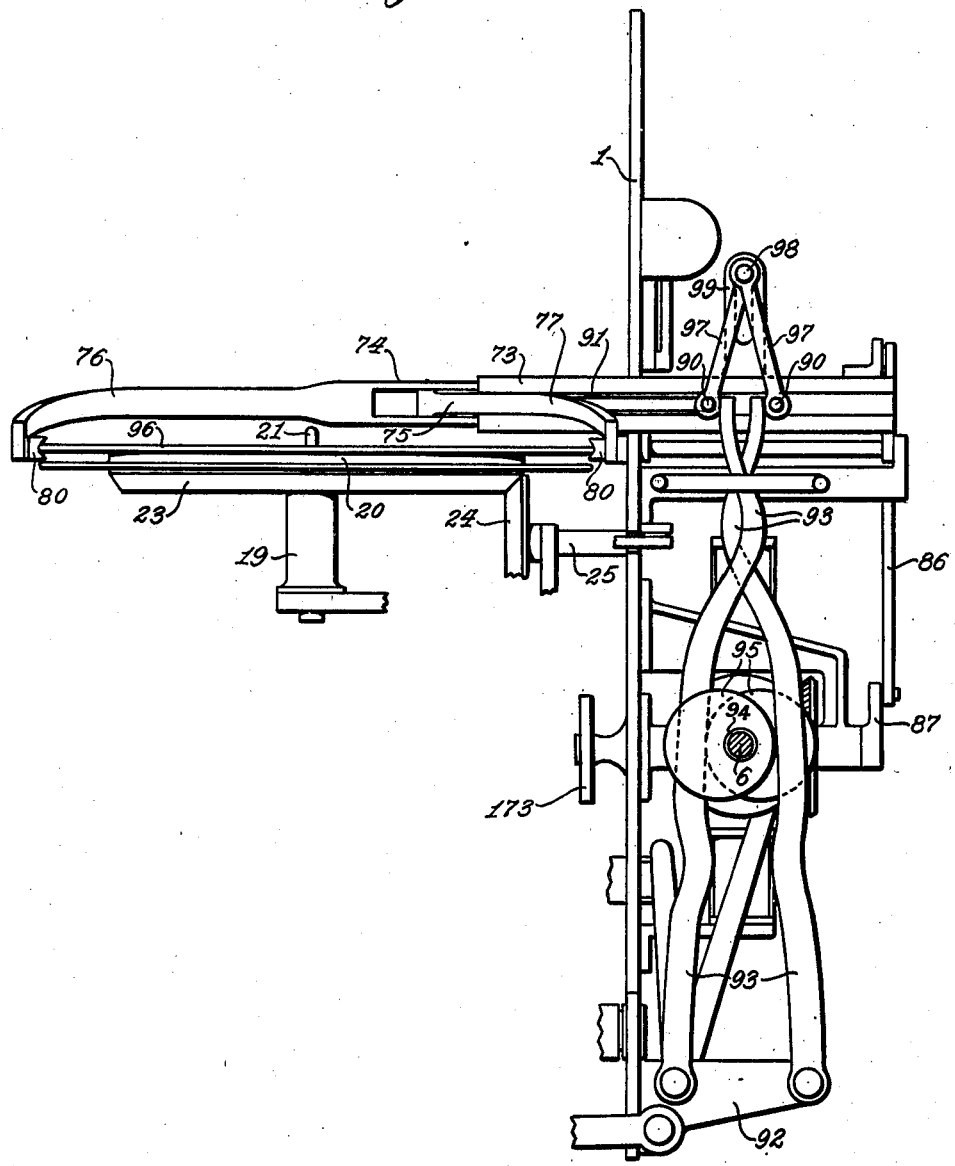
Fig. 9 is a partial sectional view taken about on line 9—9, Fig. 1.

The members 74 and 75 are held in relative contracted relation by a spring 89 (Fig. 12) connecting pins 90, the pin in the member 74 extending through a slot 91 in the member 75 (Fig. 9); the pins project beyond these members on both sides. Pivoted on a bracket 92 on the plate 1 is a pair of levers 93 whose upper ends are positioned between the pins 90. Intermediate their ends the levers 93 pass on opposite sides of the shaft 6, as shown in Fig. 9. Mounted on a sleeve 94 on the shaft 6 is a pair of eccentric cams 95 one of which is positioned to engage each of the levers 93. The sleeve 94 is arranged to be connected for rotation by the clutch 9. The cams 95 operate upon rotation of the sleeve 94 to spread the levers 93 apart. The latter, during such movement, engage the pins 90 so as to separate the arms 76 and 77. Uuon further rotation, the arms 93 are permitted to collapse so that the arms 76 and 77 are brought together in order that the fingers 80 may engage the edges of a record 96 on the playing table. In order to insure proper centering of the record a pair of links 97, Fig. 9, connected at their ends to the members 74 and 75, by pins 90, are pivoted together at 98 on a pivot adapted to slide in a vertical slot in an upstanding bracket 99 upon the guide 73.

Figure 13:
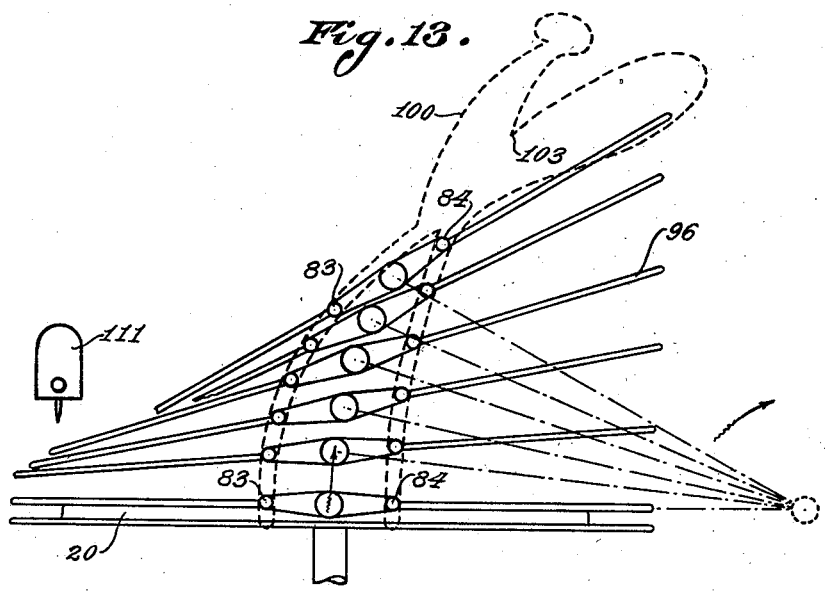
Figs. 13, 14, 15 and 16 are diagrams illustrating the operation of the record inverting cam.
Figure 14:
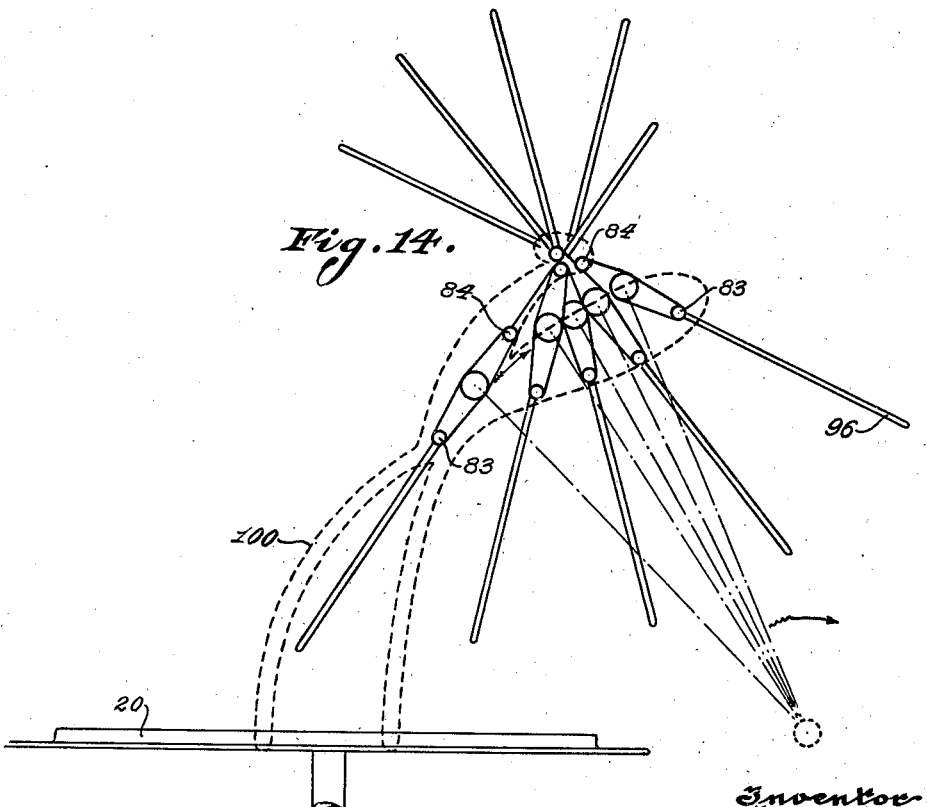
Figure 15:
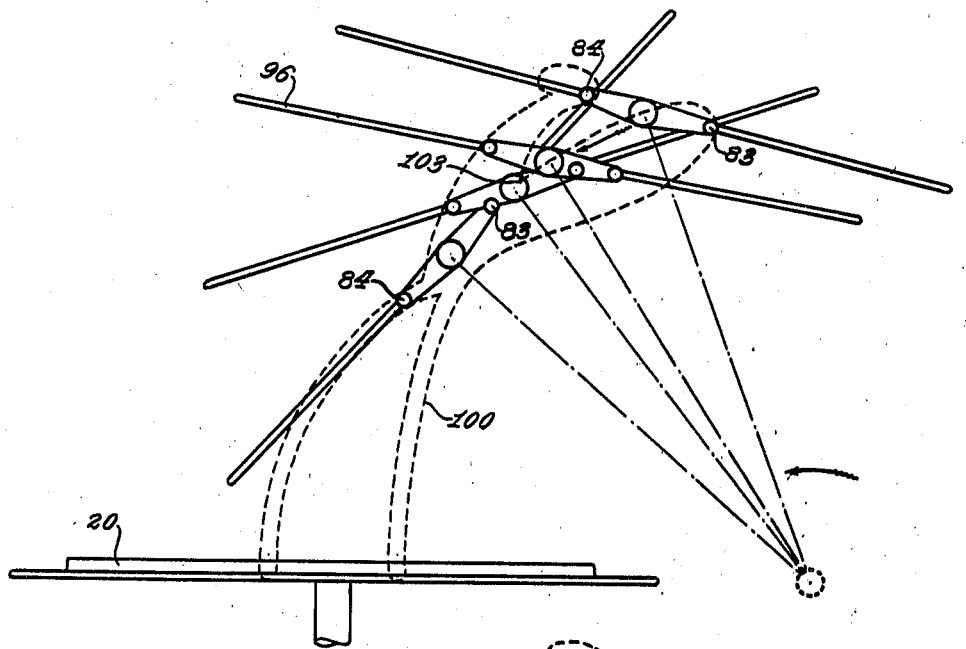
Figure 16:
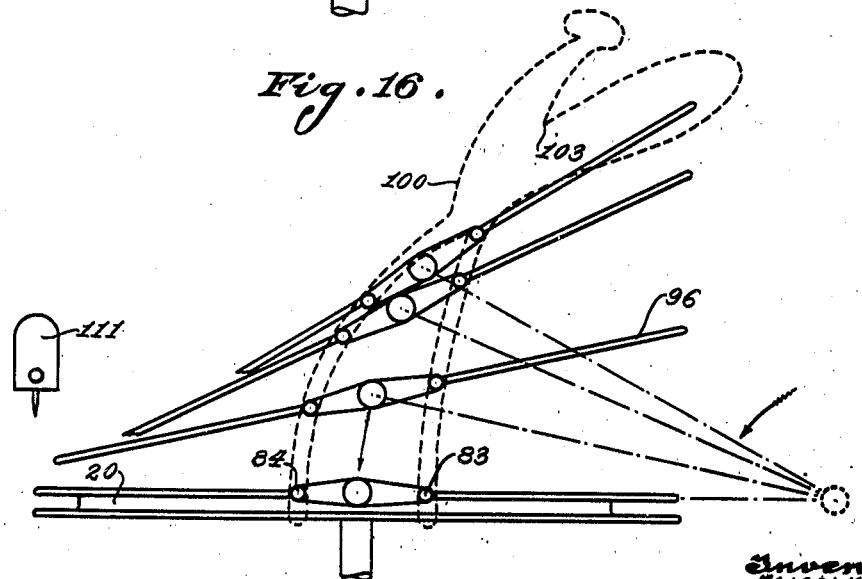

The sequence of operation is such that the arms 76—77, being normally held separated are brought together so as to engage the record 96 and thereafter the guide 73 is rocked on its pivot 71 so as to swing the arms upwardly to lift the record from the table. During this movement the pins 83 and 84 travel in a cam slot 100 of special form in a cam plate 101 mounted on suitable supports 102 Figs. 1-2, on the plate 1. The cam slot is of peculiar form, as shown in Figs. 12 to 15 inclusive. Figs. 13 and 14 illustrate the movement of the pins in the slot during the upward movement of the arms, while Figs. 15 and 16 illustrate their action during the downward movement. During the first part of the upward movement, the pin 83 engages the upper edge of the left hand arm of the cam slot while the pin 84 moves freely in the other arm of the slot. At the completion of the first part of this movement, the pin 84 is moving in advance of the pin 83 and leaves the lower arm of the slot earlier than the pin 83. By this time the record has taken up a definite velocity of rotation on the pivots provided by the gripping members and has accumulated some momentum of rotation. This momentum carries the pin 84 upwardly after it leaves a lower branch of the slot so that upon further movement it passes to the upper side of the point 103 of the cam plate. Following this movement of rotation the pin 83 then enters the right hand branch of the upper portion of the slot. By the time the limit of movement has been reached the relative positions of the pins 83 and 84 have been practically reversed. Referring now to Figs. 15 and 16, which illustrate the subsequent downward movement, the pin 84 is carried into engagement with the upper edge of the left hand branch of the upper portion of the cam slot. It will be seen that such engagement forces the pin 84 downwardly along the edge of the slot until it finally enters the left hand branch of the lower portion of the slot which was formerly occupied by the pin 83. Further movement carries the pin 83 into the right hand branch of the lower portion of the slot and eventually the record is returned to the playing table in inverted position.

It will be noted that this movement not only operates to invert the record by a simple up and down movement, of the arms, but the movement of the record is carried out in a peculiar manner. As seen in Fig. 13, the record is lifted from the table in such a manner that its left hand edge is retarded and kept low so as to avoid contact with the reproducer 111 which is at this time above that side of the table. The record is then carried to the right to a position where it may be inverted without danger of conflict with the reproducer 111 after which in its inverted position, the left hand edge is again depressed before lowering the record to the table. Accordingly all liability of bringing the record into contact with the reproducer is avoided.

*Tone arm mechanism*

The mechanism for operating the tone arm is illustrated more particularly in Figs. 1, 10, 11 and 17 to 21 inclusive. Mounted for vertical sliding movement in a window 104 cut in the plate 1 is a bracket 105 upon which are mounted a lower rail 106 and an upper rail 107. Mounted to roll on ball bearings on the rolls 106 and 107, is a carriage 108 carrying a tone arm 109 having pivoted thereto at 110, a reproducer 111. A lead screw 112 is mounted on bearings on the plate 1 and is connected by suitable gearing to be driven from the shaft 4. The pitch of the lead screw 112 may be the same as that usually met with in playing records so that the movement of the tone arm may keep pace with that of the record. A half nut 113 on the carriage 108 is arranged to engage the lead screw 112.

The clutch 8 (Fig. 1) is arranged to connect for rotation with the shaft 6 a gear 114 meshing with a gear 115 having pivoted thereto a link 116 pivoted at its upper end to the bracket 105. The gear ratio between the gears 114 and 115 is one to two, so that the latter gear will make one half revolution while the former makes a complete revolution. When the clutch 8 is engaged, therefore, the gear 115 rotating through a half revolution will raise the bracket 105 thereby disengaging nut 113 from lead screw 112 and lifting the tone arm and its reproducer clear of the record. The height of lift is made sufficient so that the record may be removed from the table and inverted as previously described.

Pivoted at 117 upon an upward extension 118 on the bracket 105 is a bell crank lever one arm 119 of which is pivoted to a link 120 while the other arm 121 is connected by a spring 122 with a lever 123 the lower end of which engages a pin 124 on the carriage 108. The lower end of the lever 120 has a slot 125 engaging a pin 126 secured to a bracket on the plate 1. When the link 116 operates to slide the bracket 105 upwardly, there is at first a certain amount of lost motion in the movement of the slot 125 over the pin 126. This permits the reproducer to be lifted from the record. After this lost motion has been taken up the link 120 is held by pin 126 with respect to the moving bracket 105 thereby causing the bell crank 119—121 to swing on its pivot, and through the spring 122 to draw the lever 123 yieldingly to the left, Fig. 10.

After the upward movement of the bracket 105 has carried nut 113 out of engagement with the lead screw 112, the lever 123 operates to move the carriage 108, to the left, Fig. 10, so as to return it to the starting point of the record. A subsequent revolution of the gear 114 will operate as described to lower the carriage 108 thereby lowering the tone arm and reproducer into engagement with the record at its starting point and re-engaging the nut 113 with the lead screw 112. Suitable stops are provided to limit the return movement of the carriage 108 in accordance with the size of the record as will be more fully described hereinafter.

The various clutches controlling the operations already described are arranged to be operated from suitable electric circuits and in proper sequence. The sequence of operations may be considered to start with the completion of the playing of a record. The tone arm 109 carries a switching device adapted to close the electric circuit which initiates the changing operations. This switching device is arranged so as to operate in accordance with the movement of the tone arm but also in accordance with the movement of the reproducer on the record. This is necessary in order that the changing action may be started at a definite interval after the completion of the playing of the record. As some records have grooves of a different pitch from others, arrangements must be made to accomplish the proper circuit closing at the proper time irrespective of the pitch of the record groove or the size of the record.

In accordance with this invention, therefore, the tone arm 109 is pivoted at 127 on the carriage 108. Accordingly the tone arm may swing laterally with respect to the carriage in order to accommodate the difference of movement between the carriage and the reproducer. Pivoted at 128 on the tone arm is an arm 129 carrying a contact adapted to engage a stationary contact 130 mounted on the carriage 108 in order to close the operating circuit. A stop 131 is positioned on the other side of the arm 129 so as to limit the possible spacing of this arm from the contact 130. The pitch of the lead screw 112 is made as small as the smallest pitch of the records liable to be encountered. Accordingly in playing other records having a greater pitch the reproducer will travel ahead of the carriage 108 so as to swing the tone arm forwardly as indicated at 109a, in Fig. 21. This movement brings the arm 129 against the stop 131. Further movement of the tone arm will swing the arm 129 on its pivot. As the mounting of this arm at the pivot is a frictional one, the arm will remain set in the new position relatively to the tone arm. When the end of the record groove is reached the reproducer can, of course, travel no further and as the feed to the carriage 108 by the lead screw 112 continues the rear end of the tone arm will be carried forward and the arm 129 will be swung into engagement with the contact 130 thereby closing the circuit which starts the changing operations. It will be noted that since the spacing of the arm 129 from the contact 130 is limited to a definite value the interval between the completion of the playing of a record and the initiation of the changing movements is substantially constant.

When the tone arm is returned to its starting position the arm 129 must also be returned to open circuit position. In order to accomplish this the following devices are provided. Mounted on the lower rail 106 is an arm 132 which extends rearwardly and upwardly so as to stand in the path of an extension 133 on the tone arm. As the arm is returned this extension strikes the end of the arm 132 which causes the tone arm to swing on its pivot so as to return it to starting position. There is also mounted on the plate 1 adjusted to starting position of the tone arm a bracket 134 which carries a spring pressed stop 135 the tip of which extends into the path of an extension 136 on the arm 129. As the tone arm is returned to starting position the stop 135 yields so as to permit it to pass and thereafter resumes a position as illustrated in Fig. 10, such as to engage the extension 136 as the tone arm begins to feed forwardly during the playing of the record. When such engagement is established the arm 129 is swung back so as to open the circuit at the contact 130. The circuit of the contact 130 is made through a clip 137 mounted on the carriage 108 and adapted to engage a contact strip 138 mounted on the upper rail 107. The strip 138 is short enough so that the clip 137 does not contact therewith until after the circuit has been opened at the contact 130. The electrical connections to the strip 138 and the contact 130 may be made in any suitable manner and are not shown as such connections are familiar to those skilled in the art.

*Sequence of operations*

Fig. 22 shows the electrical connections and mechanism associated therewith in diagrammatic form so that the sequence of operations may be followed therefrom. In this figure 139 represents an electrical supply line as it enters the device. This may be from any suitable supply circuit, usually a 110 volt house circuit from which power is derived for operating the machine. Connected to the supply 139 is a transformer 140 which reduces the voltage to a low value suitable for operating the various solenoids to be described later. The use of the transformer 140 is a matter of convenience. Such a transformer could be dispensed with by winding the solenoids for the line voltage. The motor 2 is also connected to the supply line 139. One of the secondary leads to the transformer 140 is grounded at 141 on plate 1. The other lead in connected to a conductor 142 forming a common return for all of the solenoids involved.

Starting with the moment of completion of playing a record and the closing of the circuit at the contact 130 this establishes a ground on a circuit including conductors 143, 144 leading to a switch 145 which is normally closed. From this switch a conductor 146 leads to a solenoid 147 whose plunger acts as a stop for the clutch 8. It will be clear, of course that the closing of the circuit at 130 will cause the solenoid 147 to retract its plunger thereby releasing the clutch 8. The action of the clutch 8, as previously described, results in the raising of the tone arm by means of the link 116. As previously described the gear ratio between the clutch 8 and the crank which operates the link 116 is one to two, so that said crank makes one half revolution while the clutch makes a complete revolution. Said crank is equipped with a contact member represented at 148 adapted to ground the circuit at the contact 149 just before its half revolution is completed. This closes the circuit through a conductor 150 which leads to one of a series of contact brushes which may be designated in pairs, A, B, C, D, E and F. These brushes bear on contact rings on a reel in order to establish circuits to the remote control device which will be described hereinafter. This device is arranged to close the circuit between the pairs of brushes as designated by the above letters.

For the purpose of identifying the pairs of contacts, A contacts control the starting of the machine; contacts B the stopping; contacts C the rejection of any record; contacts D the repeating of any record; contacts E the change of records, and contacts F the re-inversion of a record. Assuming that the contacts E are closed which is the condition for normal operation of the machine, a circuit is established from the conductor 150 through the conductor 151, contacts E, conductor 152 to the central point 153 of a switch 154. The switch 154 has an arm adapted to make contact with either of two stationary contacts 155 and 156. Another arm of this switch extends into the path of the driving member 13 of the Geneva gear so as to be engaged thereby during its rotation in order to change the position of the switch from engagement with the contact 155 to engagement with the contact 156. Assuming the switch in the position shown in full lines in Fig. 22, so as to contact at 155, the circuit is established thereby through a conductor 157 to a solenoid 158 whose plunger stands in the path of the dog of a clutch 159 which controls the operation of the element 13 of the Geneva gear. Closing this circuit causes the solenoid 158 to retract its plunger thereby causing operation of the Geneva gear to rotate the turret so as to bring a new record into playing position. During its rotation the member 13 strikes the arm of the switch 154, throwing this switch to the dotted line position. This breaks the circuit to the solenoid 158 and establishes a new circuit through the switch 154. During its rotation the member 13 also engages a contact 160 thereby establishing a ground circuit through conductors 161 and 144, switch 145 and conductor 146 to the solenoid 147. This solenoid thereupon again releases the clutch 8 so as to cause the mechanism controlled thereby to lower the tone arm upon the new record, said arm having been returned to starting position during its up and down movement as previously described.

The above describes the operation of changing records. When the first face of a new record has been played, the circuit is again closed at contact 130 causing the operation of the solenoid 147 which controls the raising of the tone arm. This operation again establishes a circuit between the contacts 148 and 149 thereby closing the circuit 150, 151, E, 152 to the point 153. The switch 154 is, however, in the dotted line position at this time. The circuit, therefore, continues to the contact 156, through conductor 162 to a solenoid 163. This solenoid operates to release the clutch 9 which as previously described, causes the arms 76 and 77 to close so as to grip the record which has just been played. One of the arms 93 which control the action of the arms 76 and 77 carries a contact adapted to engage a stationary contact 164 at the completion of its movement to close the gripping arms. This establishes a circuit through conductor 165 to a solenoid 166 which acts to release the clutch 167 controlling the operation of the record inverting mechanism through the agency of the link 86. This mechanism then operates to remove the record from the table invert, and replace the same. The link 86 carries a contact adapted on its return movement to engage a stationary contact 168. This link also carries a pin 169 adapted to engage the switch 154 to return it to the full line position, Fig. 22. The clutch 167 is also equipped with a dog 170 adapted to engage a movable stop 171 when the revolution of the clutch has been nearly completed. The stop 171 operates to arrest the clutch 9 after a half revolution so as to maintain the gripping arms in gripping position until the record has been inverted and replaced on the table.

When this has been accomplished the dog 170 engages and lifts the stop 171 thereby releasing the clutch 9 which then executes its second half revolution so as to separate the gripping arms and release the record. Upon engagement of the contact on the link 86 with the contact 168 a circuit is established through conductors 270, 161, 144, switch 145 and conductor 146 to the solenoid 147 which then acts to lower the tone arm.

It will be seen that the two operations of changing the records and inverting the records, are carried out alternately. Accordingly every record has its two faces played in succession.

As provision is made in the mechanism for handling both 10 and 12 inch records, the necessary changes may also be controlled electrically. The return movement of the tone arm must be controlled in accordance with the size of the record. In order to do this a solenoid 172 is positioned so that its plunger stands in the path of the carriage 108 providing a stop adapted to arrest the carriage in the starting position for a 10 inch record.

When a 12 inch record is fed by the magazine on to the playing table its edge engages a dog 173 (Figures 3, 9 and 22) pivoted on the plate 1, and held normally in dotted line position, as shown in Fig. 22, so as to stand in the path of the rim of a 12 inch record but beyond the rim of a 10 inch record. The engagement of the record 96 with the dog 173 rotates said dog on its pivot to the full line position, Fig. 22. This causes the lower end of the dog to engage and close the switch 174. When this switch is closed contacting of the member 13 with the contact 160 will establish a circuit through said contact, the conductor 175, switch 174 and conductor 176 to the solenoid 172. The solenoid then retracts its plunger out of the path of the carriage 108. The plunger of this solenoid extends downwardly and is provided with a notch adapted to engage a latch bar 215 Fig. 1, spring pressed into engagement therewith. This retains the plunger in retracted position when the solenoid circuit is again opened. With the plunger thus retracted the next operation of the tone arm returning mechanism will cause the carriage 108 to pass beyond the solenoid so as not to be arrested until it reaches a stop 177 positioned so as to locate the tone arm at the starting point of a 12 inch record. The stop 177 may be connected with a second stop 178 positioned for a 10 inch record, these stops being interconnected so that by manual operation one or the other may be positioned to engage the carriage 108. The bar 215 has a turned over end 194 (Figure 1) standing in the path of the member 13 so as to be unlatched by said member at the next record changing operation.

The return circuit from all of the solenoids except 147 and 172 is established by a conductor 185 through a switch 186 to the conductor 142 leading to the transformer 140.

*Special operations*

Closing the circuit at the brushes A establishes a circuit from the supply line 139 through conductors 179, 180, 181 to a solenoid 182 which operates to close the switch 183. The switch 183 establishes a circuit from the conductor 179 through the conductor 184 to the motor 2. This starts the operation of the machine.

Closing the circuit at the brushes B, establishes a circuit from a ground connection 187 through conductor 188 to a solenoid 189 whose other terminal is connected to the common return conductor 185. The solenoid 189 operates to open the switch 183 in order to stop operation of the machine.

As it may be desired at any time to reject a record without playing the same or after the playing has been begun, provision is made for such an operation which may be effected by closing the circuit at C. This establishes a circuit from the ground connection 187 through the conductor 190, 144, switch 145 etc., to the solenoid 147 which starts the operation of changing records in the same manner as when the circuit is closed at 130.

In order to repeat the playing of any record the circuit is closed at brushes D. This establishes a circuit between the conductors 190 and 150 so that when the playing of the record is completed and the circuit closed at 130, the normal operation of raising and returning the tone arm will be started by the solenoid 147. When contact is made, however, between 148 and 149, the circuit being open at this time at E, the circuit is re-established from the ground at 148 through contact 149, conductor 150, brushes D, conductor 190, 144, switch 145 etc., back to solenoid 147 which operates immediately to lower the tone arm again upon the record. During this time none of the other solenoids have been actuated so that none of the changing operations are carried out. It will be understood, of course, that the contacting devices controlling the circuit at the brushes A, B, C, D, E and F are operative to close the circuit at only one pair of these brushes at a time.

In order to operate the machine as a single record phonograph so that records may be manually placed upon the playing table and the automatic features duly eliminated a key 191 is provided, which is shown in Fig. 22, diagrammatically as an eccentric cam and arranged as in the position shown it normally holds the switches 145 and 186, closed. By turning this key so as to bring the cam portion down the switches 145 and 148 are permitted to open while the cam makes contact with a contact 192 connected to the conductor 176 leading to the solenoid 172. The action of this key, therefore, opens the control circuits to all the solenoids except 147 and 172, which latter is operated to retract its plunger out of the way of the carriage 108. In playing the machine as a single record phonograph, none of the automatic operations are required except the raising and returning of the tone arm. This operation may be carried out by pressing a push button 193 which grounds the conductor 146 leading to the solenoid 147 thereby operating said solenoid to raise and return the tone arm. When the record has been changed or inverted manually the button 193 is again pressed so as to cause the lowering of the tone arm on the record. Stops 177 and 178 are operated manually in accordance with the size of the record being used.

It may be desired after one face of a record has been played and the record inverted for playing the other face, to repeat the playing of the first face of this same record. In such a case the inverting of the record may be carried out by closing the circuit at the brushes F. Under these conditions the closing of the contact 130 will operate the solenoid 147 as previously described, to raise the tone arm. In this case, however, when contact is established at 149 the circuit will be closed through 150, F, 162, to the solenoid 163 which initiates the operation of inverting the record. This operation is then carried out in the manner previously described. As the other circuits are open at this time none of the other operations will be carried out. Accordingly, the same record having been inverted may be played again on its first face.

Remote control devices

In order to be able to control the machine from a distant point as for instance, from a chair without leaving the chair, or from other distant points such as another room, the device shown in Figs. 23, to 26, inclusive, is provided. Mounted in any suitable manner in the cabinet which houses the machine, is a cup 195 which provides a housing for the remote control switch. Removably mounted in the cup 195 and frictionally retained therein in any suitable manner is a casing 196 having a hollow bore provided with a bottom or floor 197. Circumferentially arranged in the floor 197 is a series of contacts 198 to which conductors 199 may be connected. These conductors may pass through perforations in the floor 197 after which they are combined into a cable which may be wound on a spring controlled reel 200 provided with slip rings 201 to which the other ends of the individual conductors 199 are connected. The brushes in pairs, A, B, C, D, E and F are arranged to contact with the slip rings 201. Fitted within the bore of the casing 196 is a cup shaped member 202 equipped with a contact brush 203 adapted to contact with a ring 204 mounted on the floor 197 and connected to one of the conductors 199. Another contact 205 is mounted on the member 202 and is arranged so as to bridge any two of the contacts 198.

Mounted within the cup shaped member 202 is a resistance coil 206. Fitted within the bore of the cup 202 is a plug 207 having yieldingly mounted thereon a secondary contact 208 adapted to engage the central contact 198. A contact brush 209 connected with the contact 208 is mounted on the bottom of the plug 207 and arranged to contact with the resistance coil 206. The cup 202 and the plug 207 may be mounted respectively on the casing 196 and the cup 202 so as to be rotatable therein. This may be accomplished by means of pins 210 engaging grooves in the inner member or in any other suitable manner.

It will be noted that the member 202 is rotatable within the casing 196 so as to cause the contact 205 to bridge any pair of contacts 198 in order to close the circuit of the brushes A, B, C, D, E and F, for purposes already set forth. The coil 206 with the brush 209 provide an adjustable rheostat which may be connected in the circuit to the reproducer or any amplifier which may be connected thereto so as to control the volume of sound produced. As seen in Fig. 24, the ends of the members 196, 202 and 207, may be provided with suitable indices to indicate by their positions the circuits controlled.

This remote control device provides a convenient means for operating the machine without leaving one's chair. The casing 196 with its contained parts may be removed from the cup 195 and carried to the chair. Meanwhile the cable will be paid off of the reel 200 so as to permit of such movement. Under other circumstances the remote control device may be permanently mounted in a distant room or office with the cable leading to the machine so that control may be carried out from such distant point.

The control provides for a fixed panel control when in place in panel cup which eliminates the necessity of a dual set of controls for this purpose.

It will be seen, therefore, that this invention provides a phonograph which is entirely automatic in all of its operations. The magazine may be filled to its capacity with records of all kinds. Records of different sizes may be placed in the magazine in any desired order, and will be played in that order. The various mechanisms adjust themselves automatically to the size of the record being played. It is pointed out, furthermore, that the two faces of each record are played in succession and it is not necessary to wait until all of the records in the magazine have been played on one face of each before being able to play the reverse face of any one. This is a distinct advantage since it is the usual practice to put two or more parts of the same piece of music upon opposite sides of the same record, or even upon a series of records so that in order to render the composition complete it is necessary to play the face of the records in the proper order.

A feature which adds great convenience to this machine is the arrangement of circuits at the brushes A, B, C, D, E and F, whereby any desired operation may be carried out at the will of the operator without waiting for the automatic operation of the machine to bring it about. Thus, any record may be rejected or repeated, or the reverse side thereof played, at any desired time.

When the machine is operating automatically and the last record has been played the magazine which receives the played records will have been filled. Accordingly further operation of the magazine will bring the last record therein against a yielding stop 211 so as to force said stop against a contact 212. This closes a circuit through conductor 213 of the solenoid 189 which operates to stop the machine.

It will be noted that the reproducer is so mounted as to move radially of the record. This is accomplished by mounting the reproducer carriage for movement along a radius of the playing table; at the same time the reproducer is mounted for free movement on its carriage in order to permit the needle to be guided by the record groove. This radial movement of the needle, as distinguished from a movement in an arc, reduces wear on both the record and the needle.

While the apparatus has been described as a unitary whole and arranged for operation in certain particular ways, it will be understood that other ways of operating the same may be found convenient and advantageous. It is furthermore to be understood that certain features or sub-combinations are of utility and may be employed without reference to or the co-operation of other features or sub-combinations. These are contemplated as a part of this invention and are within the scope of the appended claims.

It is obvious that various changes may be made in the details of construction and operation, within the scope of the appended claims, without departing from the spirit of this invention. It is, therefore, to be understood that this invention is not to be limited to the specific details shown and/or described.

Having thus described the invention, what is claimed is:

1. In a phonograph having a playing table adapted to receive a record, moving means adapted to remove the record from the table, and a cam along the path of and engaging said removing means and operating to invert the record.

2. In a phonograph having a playing table adapted to receive a record, moving means adapted to remove the record from the table having a pin, and means along the path of said moving means providing a cam groove adapted to guide said pin so as to invert the record.

3. A phonograph, comprising, a playing table, a reproducing device adapted for cooperation with a record on said table, means for placing a record on said table, and means adapted to move the record to centering position while being placed.

4. A phonograph, comprising, a playing table, a reproducing device adapted for cooperation with a record on said table, means for placing a record on said table, and means adjustable to records of different sizes adapted to move the record to centering position while being placed.

5. A phonograph, comprising, a playing table, a reproducing device adapted for cooperation with a record on said table, means for placing a record on said table adapted to hold the record eccentrically with respect to said table, and means for moving the record to concentric position while being placed on said table.

6. A phonograph, comprising, a playing table, a reproducing device adapted for cooperation with a record on said table, a yieldable center pin on said table, means for moving the record eccentrically against said pin, and means for moving the record to concentric position while engaged by said pin.

7. A phonograph, comprising, a playing table, a reproducing device adapted for cooperation with a record on said table, a yieldable center pin on said table, means for moving the record eccentrically against said pin, and means automatically adjustable to records of different sizes for moving the record to concentric position while engaged by said pin.

8. A phonograph, comprising, a playing table adapted to receive a record, a reproducing device mounted on a tone arm movable across the record, means actuated at the end of the playing of a record adapted to lift said tone arm from the record, means operating upon lifting of said tone arm adapted to return the same to the starting point of the record, an electro-magnetically movable stop for said tone arm, a circuit for actuating said stop, and means for automatically energizing said circuit to move said stop.

9. A phonograph, comprising, a playing table adapted to receive a record, a reproducing device mounted on a tone arm movable across the record, means actuated at the end of the playing of a record adapted to lift said tone arm from the record, means operating upon lifting of said tone arm adapted to return the same to the starting point of the record, an electro-magnetically movable stop for said tone arm, a circuit therefor, and automatic means for selectively energizing said circuit in accordance with the size of the record to be played.

10. A phonograph, comprising, a playing table adapted to receive a record, a reproducing device mounted on a tone arm movable to follow the record groove across the record, means actuated in consequence of the travel of said tone arm a predetermined interval after said tone arm reaches the end of the record groove adapted to return said tone arm to the starting point of the record, and means actuated after a predetermined operation of said returning means adapted to invert the record.

11. A phonograph, comprising, a playing table adapted to receive a record, a reproducing device mounted on a tone arm movable to follow the record groove across the record, mechanism adapted to invert the record, independent mechanism adapted to remove the record just played from playing position and to place a new record in playing position, and means actuated in consequence of the travel of said tone arm at the end of the playing of each record adapted to operate said mechanisms alternately.

12. A phonograph, comprising, a playing table adapted to receive a record, a reproducing device mounted on a tone arm movable to follow the record groove across the record, mechanism adapted to invert the record, mechanism adapted to remove the record just played from playing position and to place a new record in playing position, and means automatically adjusted to records of different sizes and actuated at the end of the playing of each record adapted to cause operation of said mechanisms alternately.

13. A phonograph, comprising, a playing table adapted to receive a record, a reproducing device mounted on a tone arm movable to follow the record groove across the record, mechanism adapted to invert the record, mechanism adapted to remove the record just played from playing position and to place a new record in playing position, means actuated at the end of the playing of each record adapted to operate said mechanisms alternately, and means adapted to initiate the operation of one of said mechanisms at any time.

14. A phonograph, comprising, a playing table, a reproducing device adapted for cooperation with a record on said table, and guiding means for moving the record relative to said table having paths which cross and are inclined to said table.

15. A phonograph, comprising, a playing table, a reproducing device adapted for cooperation with a record on said table, and means for inverting a record on said table adapted to cause said record to move in an inclined path near said table and having crossed guiding grooves for inverting the record.

16. A phonograph, comprising, a playing table, a reproducing device adapted for cooperation with a record on said table, and means for inverting a record on said table including a cam whose termini cross and are inclined to said table.

17. A phonograph, comprising, a playing table, a reproducing device adapted for cooperation with a record on said table, means for inverting a record on said table including a cam whose termini cross and are inclined to said table, a revoluble record carrier, and rolls on said carrier engaging said cam.

18. A phonograph, comprising, a playing table, a reproducing device adapted for cooperation with a record on said table, means for inverting a record on said table including a cam, a revoluble record carrier cooperating with said cam, and means for moving said carrier along said cam.

19. A phonograph, comprising, a record magazine, a playing table cooperating therewith, means for moving said table relative to said magazine to receive a record, a yielding centering pin normally projecting from said table to cooperate with the record, and means for centering the record on said table.

20. A phonograph, comprising, a playing table, a reproducer movable across a record on said table, means operating automatically to shift a series of record faces to successively cooperate with said reproducer, means operating automatically at the completion of the playing of a record to return said reproducer, automatic devices for controlling the operation of said shifting and returning means to play the series of record faces in succession including electric circuits to said devices, and selective means for setting said circuits adapted to vary the sequence of the record faces.

21. A phonograph, comprising, a playing table, a reproducer movable across a record on said table, means operating automatically to shift a series of record faces to successively cooperate with said reproducer, means operating automatically at the completion of the playing of a record to return said reproducer, automatic devices for controlling the operation of said shifting and returning means to play the series of record faces in succession including electric circuits to said devices, and selective means for controlling said circuits adapted to render operative only the circuit to said returning means.

22. A phonograph, comprising, a record table, a tone arm provided with a reproducing device having a needle guided by the record on said table, means travelling radially of said table for mounting said tone arm adapted to permit the tone arm to move radially of the record relatively to its mounting, and means actuated by said tone arm upon such relative movement to a predetermined extent adapted to readjust the playing condition of the phonograph.

23. A phonograph, comprising, a record table, a tone arm provided with a reproducing device having a needle guided by the record on said table, means travelling radially of said table for mounting said tone arm adapted to permit the tone arm to move radially of the record relatively to its mounting, operating mechanism connecting said table and said tone arm, and means actuated by said tone arm upon such relative movement to a predetermined extent adapted to readjust said mechanism.

24. A phonograph, comprising, a record table, a tone arm provided with a reproducing device having a needle guided by the record on said table, means travelling radially of said table for mounting said tone arm adapted to permit the tone arm to move radially of the record relatively to its mounting, operating mechanism connecting said table and said tone arm having an electric control circuit, and means actuated by said tone arm upon such relative movement to a predetermined extent adapted to readjust said control circuit.

25. A record reversing mechanism comprising record engaging members, means adapted to raise and lower said record engaging members successively, and means for inverting said members and the record engaged thereby during the raising and lowering movement thereof.

26. In a record reversing mechanism, record engaging means comprising a pair of arms adapted to engage one on each side of a record to be reversed, means adapted to raise and lower said record engaging means successively, and means for inverting said record engaging means and the record engaged thereby during the raising and lowering movement thereof.

MALCOLM L. ORD.